US009001089B2

(12) United States Patent
Choi et al.

(10) Patent No.: US 9,001,089 B2

(45) Date of Patent: Apr. 7, 2015

(54) DATA DRIVING APPARATUS AND METHOD FOR LIQUID CRYSTAL DISPLAY DEVICE

(75) Inventors: Seung-Chan Choi, Seoul (KR); Min-Doo Chun, Carlstadt, NJ (US); Binn Kim, Seoul (KR); Nam-Wook Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 855 days.

(21) Appl. No.: 12/149,468

(22) Filed: May 1, 2008

(65) Prior Publication Data

US 2008/0309687 A1 Dec. 18, 2008

(30) Foreign Application Priority Data

May 1, 2007 (KR) ........................ 10-2007-0042379

(51) Int. Cl.

*G06F 3/038* (2013.01)
*G09G 5/00* (2006.01)
*G09G 5/10* (2006.01)
*G09G 3/36* (2006.01)

(52) U.S. Cl.

CPC ............ *G09G 3/3648* (2013.01); *G09G 3/3614* (2013.01); *G09G 2320/0233* (2013.01); *G09G 2320/0252* (2013.01)

(58) Field of Classification Search

USPC .......................................................... 345/204

See application file for complete search history.

(56) References Cited

U.S. PATENT DOCUMENTS

| | | | | |
|---|---|---|---|---|
| 6,806,859 | B1 * | 10/2004 | Kanoh et al. | 345/98 |
| 7,304,628 | B2 * | 12/2007 | Hashimoto | 345/98 |
| 7,382,349 | B1 * | 6/2008 | Kuhns | 345/102 |
| 7,573,454 | B2 * | 8/2009 | Morita | 345/100 |
| 2001/0052897 | A1 * | 12/2001 | Nakano et al. | 345/204 |
| 2002/0163488 | A1 * | 11/2002 | Song et al. | 345/87 |
| 2005/0073630 | A1 * | 4/2005 | Chen et al. | 349/87 |
| 2006/0007093 | A1 * | 1/2006 | La | 345/96 |
| 2007/0040791 | A1 * | 2/2007 | Pai | 345/100 |
| 2007/0046613 | A1 * | 3/2007 | Ha et al. | 345/98 |
| 2008/0055229 | A1 * | 3/2008 | Shen et al. | 345/102 |

FOREIGN PATENT DOCUMENTS

CN 1702731 A 11/2005

* cited by examiner

*Primary Examiner* — Andrew Sasinowski

*Assistant Examiner* — Nguyen H Truong

(74) *Attorney, Agent, or Firm* — McKenna Long & Aldridge LLP

(57) ABSTRACT

A data driving apparatus and method for a liquid crystal display (LCD) device is provided, the apparatus including: a liquid crystal panel; a timing controller configured to output control signals for controlling the driving of a gate driving unit and a data driving unit; a gate driving unit configured to output a gate on signal to gate lines of the liquid crystal panel; a data driving unit configured to drive data lines of the liquid crystal panel, the data driving unit providing an overdriving signal to at least one of a pair of pixel signals of the same polarity applied to adjacent data lines for supply to longitudinally adjacent pixels of the liquid crystal panel, and wherein the data driving unit drives the liquid crystal panel according to a longitudinal two-dot inversion polarity pattern.

5 Claims, 6 Drawing Sheets

FIG. 1A
RELATED ART

| | | | | | |
|---|---|---|---|---|---|
| − | + | − | + | − | + |
| − | + | − | + | − | + |
| + | − | + | − | + | − |
| + | − | + | − | + | − |
| − | + | − | + | − | + |
| − | + | − | + | − | + |

FIG. 1B
RELATED ART

| | | | | | |
|---|---|---|---|---|---|
| + | − | + | − | + | − |
| + | − | + | − | + | − |
| − | + | − | + | − | + |
| − | + | − | + | − | + |
| + | − | + | − | + | − |
| + | − | + | − | + | − |

| | | | | |
|---|---|---|---|---|
| + | − | + | − | BRIGHTNESS |
| + | − | + | − | DARKNESS |
| − | + | − | + | BRIGHTNESS |
| − | + | − | + | DARKNESS |
| + | − | + | − | BRIGHTNESS |
| + | − | + | − | DARKNESS |
| − | + | − | + | BRIGHTNESS |
| − | + | − | + | DARKNESS |
| + | − | + | − | BRIGHTNESS |
| + | − | + | − | DARKNESS |

—·— NORMAL PIXEL SIGNAL (S3)
——— OVERDRIVEN PIXEL SIGNAL (S1)
—··— PIXEL CHARGING VOLTAGE (S2)

FIG. 8

| | | | | |
|---|---|---|---|---|
| + | − | + | − | OVERDRIVEN PIXEL SIGNAL |
| + | − | + | − | NORMAL PIXEL SIGNAL |
| − | + | − | + | OVERDRIVEN PIXEL SIGNAL |
| − | + | − | + | NORMAL PIXEL SIGNAL |
| + | − | + | − | OVERDRIVEN PIXEL SIGNAL |
| + | − | + | − | NORMAL PIXEL SIGNAL |
| − | + | − | + | OVERDRIVEN PIXEL SIGNAL |
| − | + | − | + | NORMAL PIXEL SIGNAL |
| + | − | + | − | OVERDRIVEN PIXEL SIGNAL |
| + | − | + | − | NORMAL PIXEL SIGNAL |

DATA DRIVING APPARATUS AND METHOD FOR LIQUID CRYSTAL DISPLAY DEVICE

This application claims the benefit of Korean Patent Application No. 10-2007-0042379, filed on May 1, 2007, which is hereby incorporated by reference for all purposes as if fully set forth herein.

BACKGROUND OF THE INVENTION

1. Field of the Invention

The present invention relates to a liquid crystal display device, and more particularly, to a data driving apparatus and method for a liquid crystal display device.

2. Discussion of the Related Art

A typical liquid crystal display (LCD) device includes a timing controller for outputting various control signals to control the driving of a gate driving unit and a data driving unit. The gate driving unit is for applying a gate on signal to each gate line on a liquid crystal panel, and the data driving unit is for applying a data signal to each data line on the liquid crystal panel. The liquid crystal panel is driven by the data signals and the gate on signals to display images.

The timing controller uses longitudinal/horizontal synchronization signal and clock signal received from a system to generate a gate control signal for controlling the gate driving unit and a data control signal for controlling the data driving unit. Additionally, the timing controller samples digital video data (RGB) input from the system and rearranges those sampled data to send to the data driving unit.

The gate driving unit responds to the gate control signal received by the timing controller by sequentially sending a scan pulse to each of gate lines GL1~GLn. Accordingly, horizontal lines on the liquid crystal panel are selected.

The data driving unit responds to the data control signal input to the timing controller to convert the digital video signal (RGB) into pixel signals corresponding to a grayscale value. The converted pixel signals are accordingly sent to each of data lines DL1~DLm on the liquid crystal panel.

The liquid crystal panel includes a plurality of liquid crystal cells arranged in a matrix on crossings between the data lines DL1~DLm and the gate lines GL1~GLn. The plurality of liquid crystal cells are driven by the pixel signals and the gate on signals to allow images to be displayed on the liquid crystal panel.

In order to drive the liquid crystal cells on the liquid crystal panel in the LCD device, inversion systems, such as a frame inversion system, a line inversion system and a dot inversion system, are used. The frame inversion system inverts a polarity of a pixel signal applied to each of the liquid crystal cells on the liquid crystal panel whenever a frame is changed. The line inversion system inverts a polarity of a pixel signal applied to each of the liquid crystal cells depending on lines (columns) on the liquid crystal panel. The dot inversion system is configured such that the liquid crystal cells on the liquid crystal panel are provided with pixel signals with opposite polarities to the pixel signals applied to the liquid crystal cells adjacent thereto in horizontal and vertical directions, and in addition the polarities of the pixel signals applied to all the liquid crystal cells on the liquid crystal panel are inverted for each frame. The dot inversion system can provide images with greater quality than the frame inversion system and the line inversion system. The inversion systems are driven using a data driving unit that responds to a polarity inversion signal applied from the timing controller.

An LCD device may be driven at a frame frequency of 60 Hz. However, in a system requiring low power consumption such as a notebook computer, the frame frequency may be decreased down to 50~30 Hz. As the frame frequency is decreased, flicker may occur in the dot inversion system. Accordingly, a two-dot inversion system as shown in FIGS. 1A and 1B is widely used.

FIGS. 1A and 1B show polarities of pixel signals for an odd frame and an even frame, the pixel signals supplied to a liquid crystal panel driven by a two-dot inversion system. It can be seen in FIGS. 1A and 1B that the polarities of the pixel signals are inverted on a dot unit basis in a horizontal direction as in the existent dot inversion system, while they are inverted on a two-dot unit basis in a longitudinal direction. The two-dot inversion system can effectively reduce flicker on a commercial screen driven at a frame frequency of 50 Hz as compared to the dot inversion system. However, the two-dot inversion system may generate a problem of a stripe phenomenon horizontally generated as explained hereinafter with reference to FIGS. 2 and 3.

FIG. 2 shows pixel signals and waveforms of charging voltages applied to liquid crystal cells on four arbitrary scan lines adjacent to one another during a certain frame on a liquid crystal panel driven by the two-dot inversion system as shown in FIGS. 1A and 1B. For a pair of positive pixel signals or a pair of negative pixel signals consecutive as a pair in a longitudinal direction sequentially supplied to the four arbitrary scan lines, the pixel signals ① and ③ applied to odd-numbered scan lines rise or fall relatively slowly to reach their target levels rather than immediately transiting to the highest or the lowest level. On the other hand, the pixel signals ② and ④ applied to even-numbered scan lines are transition rapidly to their target levels.

The difference in transition time occurs because for the pixel signals ① and ③ applied to the odd-numbered scan lines of the positive pixel signals or negative pixel signals consecutive as the pair in the longitudinal direction sequentially applied to the four arbitrary scan lines, a relatively long rising or falling time is needed when the pixel signals are changed from positive signals to negative signals or vice versa, while for the pixel signals ② and ④ applied to the even-numbered scan lines, such a time is not needed because the pixel signals are changed from signals with the same polarity.

As a result, among pixels corresponding to the four scan lines to which consecutive positive pixel signals or consecutive negative pixel signals with being adjacent to each other in the longitudinal direction are applied, the even-numbered pixels are fully charged to a level very nearly equal to the target level, but the odd-numbered pixels are not fully charged to the target level. For a liquid crystal panel with high resolution, the available time becomes short for gate signals and pixel signals, and in particular, delay is more severe for the pixel signals. Accordingly, the pixel signals on the odd-numbered pixels may have worse charging characteristics resulting in a visible occurrence of horizontal stripe phenomenon as shown in FIG. 3.

In the two-dot inversion system of the LCD device of the related art, the even-numbered pixels among the longitudinally adjacent four pixels are fully charged up to the almost desired levels but the odd-numbered pixels are not fully charged, thereby causing the horizontal stripe phenomenon due to the difference of brightness.

SUMMARY OF THE INVENTION

Accordingly, the present invention is directed to a data driving apparatus and method for liquid crystal display device that substantially obviates one or more of the problems due to limitations and disadvantages of the related art.

An advantage of the present invention is to provide a liquid crystal display device that prevents an occurrence of stripe phenomenon due to a charging deviation of pixel voltages on a liquid crystal panel in a liquid crystal display (LCD) device such that a phenomenon pixels are not fully charged can be prevented by overdriving at least one of two longitudinally adjacent pixels upon driving a liquid crystal panel in a liquid crystal display (LCD) device by employing a two-dot inversion system.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a data driving apparatus for an LCD device including: a liquid crystal panel including a plurality of gate lines crossing a plurality of data lines to define pixels; a timing controller configured to output control signals for controlling the driving of a gate driving unit and a data driving unit; a gate driving unit configured to output a gate on signal to each of the gate lines of the liquid crystal panel; a data driving unit configured to drive the data lines of the liquid crystal panel, wherein the data driving unit provides an overdriving signal to at least one of a pair of pixel signals of the same polarity applied to adjacent data lines for supply to longitudinally adjacent pixels of the liquid crystal panel, and wherein the data driving unit drives the liquid crystal panel according to a longitudinal two-dot inversion polarity pattern; and the liquid crystal panel configured to display images upon driving by the pixel signals and the gate on signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1A and 1B are tables of odd frames and even frames representing polarities of pixel signals according to a two-dot inversion system in a liquid crystal display (LCD) device according to the related art;

FIG. 8 is a table illustrating overdriven pixel signals according to the present invention.

DETAILED DESCRIPTION OF THE ILLUSTRATED EMBODIMENTS

Figure 2:
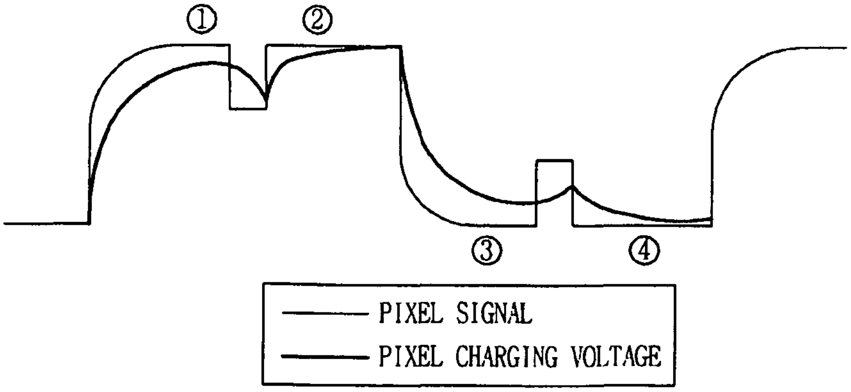
FIG. 2 RELATED ART
FIG. 2 is a waveform diagram illustrating pixel signals and charging voltages applied to liquid crystal cells on two adjacent scan lines in the related art LCD device.
Figure 3:
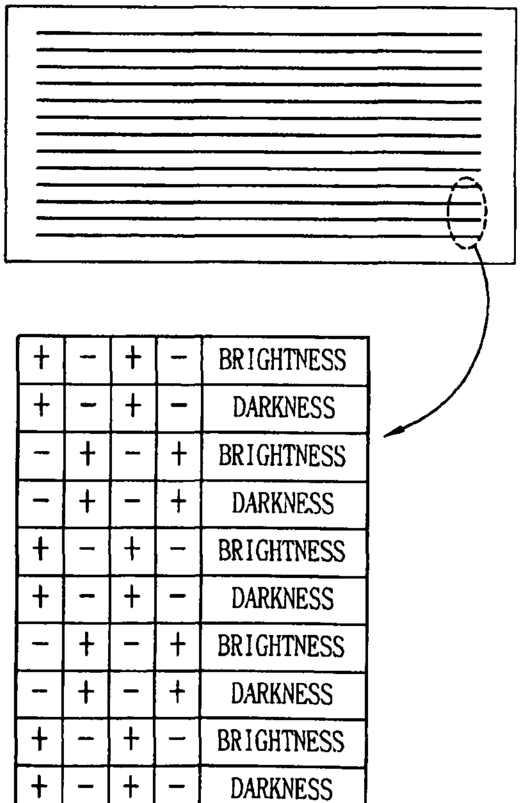
FIG. 3 RELATED ART
FIG. 3 is a view showing a horizontal stripe phenomenon in the related art LCD device.

Reference will now be made in detail to embodiments of the present invention, examples of which are illustrated in the accompanying drawings. Wherever possible, the same reference numbers will be used throughout the drawings to refer to the same or like parts A data driving apparatus for an LCD device in accordance with an embodiment of the present invention may include a timing controller for outputting various control signals to control the driving of a gate driving unit and a data driving unit, a gate driving unit for outputting a gate on signal to each of gate lines on a liquid crystal panel, a data driving unit for overdriving at least one pixel signal of a pair of positive pixel signals or a pair of negative pixel signals, each pair being consecutive with each other in a longitudinal direction and the pixel signals as a pair being consecutive with each other in the longitudinal direction, when driving each of data lines on the liquid crystal panel according to a longitudinal two-dot inversion system, and a liquid crystal panel driven by the pixel signals and the gate on signals to display images.

The data driving unit may include a controlling unit for outputting various control signals required for each component in the data driving unit, a bidirectional shift register for generating pulse signal(s) which is used to latch R, G and B pixel signal(s), a latch for simultaneously latching and then simultaneously outputting a certain bit (e.g., 6 bits) of image data of odd frames and even frames by using a certain bit (e.g., 64 bits) of pulse input from the bidirectional shift register as a clock signal, a gamma reference voltage output unit for generating positive and negative reference voltages each having 64 bits by using a certain bit (e.g., 10 bits) of gamma reference voltage input from the exterior, P-decoder and N-decoder for respectively converting the image data input by the latch into the corresponding positive or negative reference voltage, a digital to analog (D/A) converter having a multiplexer for selectively outputting either the positive analog pixel signal output from the P-decoder or the negative analog pixel signal output from the N-decoder, and an output buffer for buffering the analog pixel signal output from the D/A converter.

Additionally, in a two-dot inversion driving method by which the polarity of a pixel signal is inverted on a liquid crystal panel by a dot unit in a horizontal direction and by a two-dot unit in a longitudinal direction, a data driving method for an LCD device according to the present invention may be implemented by overdriving at least one pixel signal of a pair of positive pixel signals or a pair of negative pixel signals, wherein each pair is consecutive with each other in a longitudinal direction and the pixel signals as a pair are consecutive with each other in the longitudinal direction.

Hereinafter, a data driving apparatus and method for an LCD device according to embodiments of the present invention will be described in detail with reference to the accompanying drawings.

Figure 4:
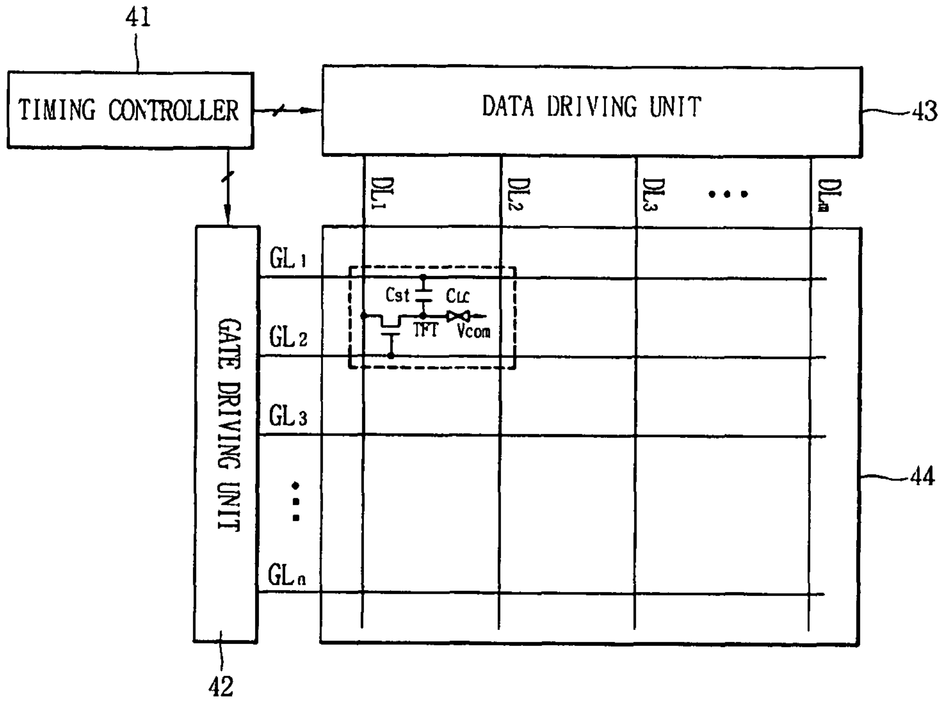
FIG. 4 is a block diagram of an LCD device according to the present invention.

FIG. 4 is a block diagram showing an exemplary data driving apparatus for an LCD device according to the present invention. As shown FIG. 4, the data driving apparatus for the LCD device according to an embodiment of the present invention may include a timing controller 41 for outputting various control signals to control the driving of a gate driving unit 42 and a data driving unit 43, the gate driving unit 42 for outputting a gate on signal to each of gate lines on a liquid crystal panel 44. The data driving unit 43 is structured for overdriving an upper pixel signal or all of upper and lower pixel signals of the pair of positive pixel signals or the pair of negative pixel signals, each pair being consecutive with each other in a longitudinal direction and the pixel signals as a pair being consecutive with each other in the longitudinal direction, when driving each of data lines on the liquid crystal panel according to a longitudinal two-dot inversion system. The liquid crystal panel 44 is driven by the pixel signal and the gate on signal to display images.

Figure 5:
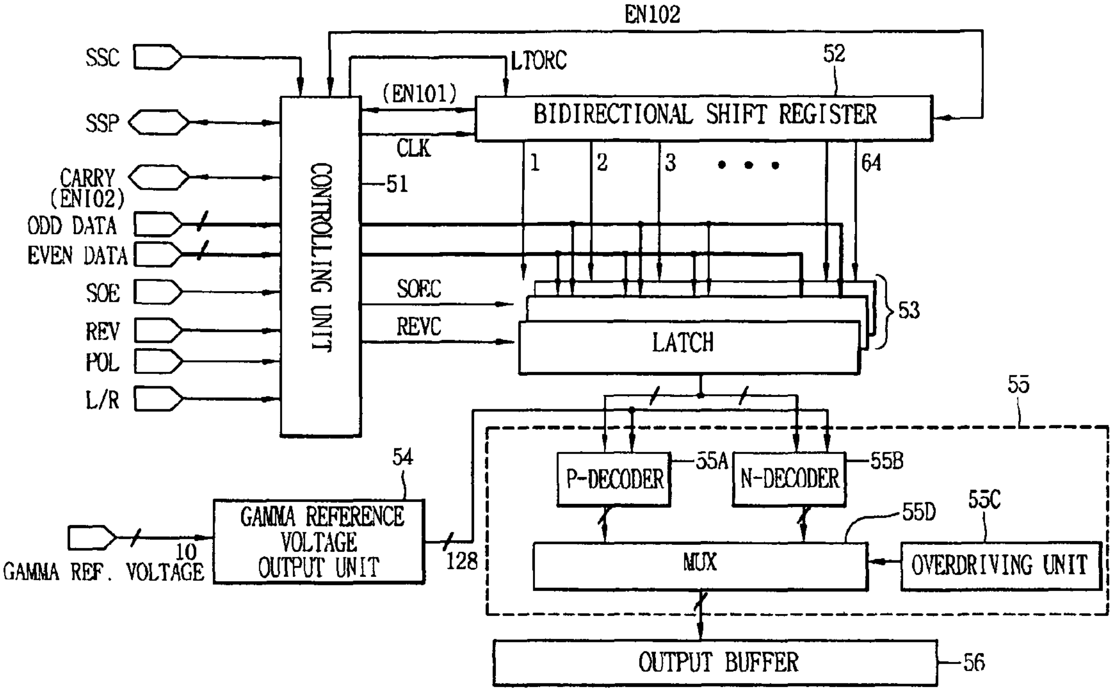
FIG. 5 is a block diagram illustrating details of a data driving unit of FIG. 4.

FIG. 5 is a block diagram showing details of an exemplary embodiment of the data driving unit 43. As shown in FIG. 5, the data driving unit 43 may include a controlling unit 51 for outputting digital data (R, G, B) received from the timing controller 41, the data having been temporarily stored in an internal register, and also outputting various control signals in order to transfer the data, a bidirectional shift register 52 for sequentially shifting a pulse for latching the digital data (R, G, B) from a left side to a right side, a latch 53 for latching each of 6-bit R, G, B digital data with an amount of 1 horizontal line output from the controlling unit 51 and shifting a level of each data by using the pulse output from the bidirectional shift register 52 as a clock signal, a gamma reference voltage output unit 54 for generating 128-level grayscale voltages for a digital/analog (D/A) conversion, a D/A converter 55 for inserting an overdriven signal into an upper pixel signal or both upper and lower pixel signals of the pair of positive pixel signals consecutive with each other in the longitudinal direction or the pair of negative pixel signals consecutive with each other in a longitudinal direction, each pair also being consecutive with each other in the longitudinal direction, when outputting the pixel signals according to the two-dot inversion system by selecting a grayscale voltage corresponding to the digital data output from the latch 53, and an output buffer 56 for buffering the analog R, G and B pixel signals output from the D/A converter 55.

Here, the D/A converter 55 may include a P-decoder 55A for converting the digital data output from the latch 53 into a negative (−) grayscale voltage as one of analog 64-level grayscales, an N-decoder 55B for converting the digital data output from the latch 53 into a positive grayscale voltage as one of the analog 64-level grayscales for output, an overdriving unit 55C for outputting overdriven positive or negative pixel signals, and a multiplexer 55D for inserting the overdriven pixel signal into the upper pixel signal or both the upper and lower pixel signals when outputting the pixel signals according to the two-dot inversion system by selecting the positive grayscale voltage output from the P-decoder 55A or the negative grayscale voltage output from the N-decoder 55B.

The operation of the LCD device and data driving unit according to the present invention and having the above described configuration will be described in detail with reference to FIGS. 6 to 8.

The timing controller 41 generates a gate control signal for controlling the gate driving unit 42 and a data control signal for controlling the data driving unit 43 by using longitudinal/horizontal synchronization signal and clock signal applied from a system. The timing controller 41 samples the digital video data (R, G, B) input from the system, and rearranges the sampled data to apply to the data driving unit 43.

The gate driving unit 42 sequentially applies a scan pulse to each of the gate lines GL1~GLn in response to the gate control signal input from the timing controller 41. Accordingly, horizontal lines on the liquid crystal panel to which data is applied are selected sequentially.

The data driving unit 43 converts the digital video data (R, G, B) into an analog pixel signal corresponding to a grayscale value in response to the data control signal input from the timing controller 41. The converted pixel signal is then applied to each of the data lines DL1~DLm on the liquid crystal panel 44. However, when driving each of the data lines DL1~DLm on the liquid crystal panel 44 according to the longitudinal two-dot inversion system, the data driving unit 43 overdrives a pixel signal applied to an upper pixel or a pixel signal applied to all the upper and lower pixels of the pair of positive pixel signals consecutive with each other in the longitudinal direction or the pair of negative pixel signals consecutive with each other in the longitudinal direction, each pair also being consecutive with each other in the longitudinal direction. Accordingly, a brightness difference due to pixels not being fully charged to target values can be avoided.

The liquid crystal panel 44 may be provided with a plurality of liquid crystal cells CLC arranged in a matrix at crossings between the data lines DL1~DLm and the gate lines GL1~GLn. The plurality of liquid crystal cells CLC are driven by the pixel signal and the gate on signal to display images.

With reference to FIG. 5 which is the block diagram showing details of the exemplary data driving unit 43, the overdriving process in the two-dot inversion system will now be described in more detail.

The controlling unit 51 outputs the digital data (R, G, B), input from the timing controller 41 and temporarily stored in an internal register to the bidirectional shift register 52. Additionally, the controlling unit 51 outputs a clock signal CLK to the bidirectional shift register 52 and the latch 53 also outputs clock signals SOEC and REVC for performing a latching operation.

The bidirectional shift register 52 sequentially shifts a pulse for latching the digital data (R, G, B) from one side to another side (e.g., from a left side to a right side) and outputs the shifted pulse.

The latch 53 latches the digital data of R(0:5), G(0:5) and B(0:5) with an amount of 1 horizontal line output from the controlling unit 51 using the pulse output from the bidirectional shift register 52, and shifts levels of the digital data into levels of system operation voltages to output them to the D/A converter 55.

The gamma reference voltage output unit 54 generates 128-level grayscale voltages for the D/A conversion at the D/A converter 55 and outputs the grayscale voltages.

The D/A converter 55 selects one of the 128-level grayscale voltages corresponding to the digital data output from the latch 53 and outputs the selected grayscale voltage. Here, for outputting a pixel signal according to the two-dot inversion system, the D/A converter 55 inserts the overdriven voltage into at least one of two pixel signals longitudinally consecutive with each other and outputs the overdrive pixel signals.

The P-decoder 55A of the D/A converter 55 converts the digital data output from the latch 53 into a negative (−) grayscale voltage as one of analog 64-level grayscales and then outputs the converted voltage. Similarly, the N-decoder 55B converts the digital data output from the latch 53 into a positive (+) grayscale voltage as one of the analog 64-level grayscales and then outputs the converted voltage. The overdriving unit 55C outputs the overdriven negative and positive data voltages.

Similar to the general case of the related art, when the multiplexer 55D selects the grayscale voltage output from the P-decoder 55A or the N-decoder 55B according to the two-dot inversion system and outputs the selected grayscale voltage, a problem occurs in that the pixel charging voltage is not fully charged to have a desired shape due to the charging characteristic of the liquid crystal panel. In particular, the initial portion of the pixel signal is not fully charged noticeably.

Figure 6A:
FIGS. 6A and 6B are waveform diagrams illustrating the source out enable signal and overdriven pixel signal, respectively.
Figure 6B:
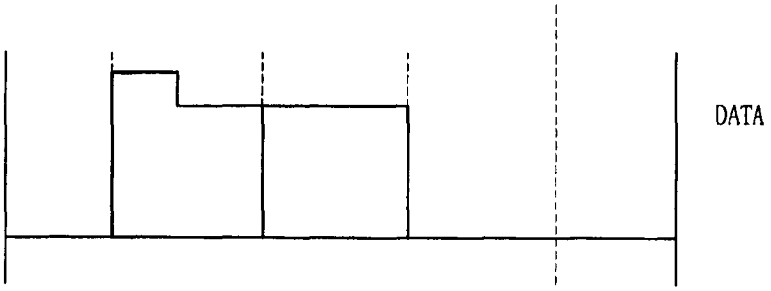

Considering this problem, according to an embodiment of the present invention, when selecting the grayscale voltage output from the P-decoder 55A or the N-decoder 55B according to the two-dot inversion system and outputting the selected grayscale voltage, for example, when selecting the positive data voltage output from the N-decoder 55B to be output, the multiplexer 55D selects and outputs the overdriven voltage output from the overdriving unit 55C at the initial portion of a first pixel signal, while selecting and outputting the positive data voltage output from the N-decoder 55B for the remaining portion other than the initial portion of the first pixel signal and for the next pixel signal. Accordingly, two pixel signals output from the multiplexer 55D are shown in FIGS. 6A and 6B.

Figure 7A:
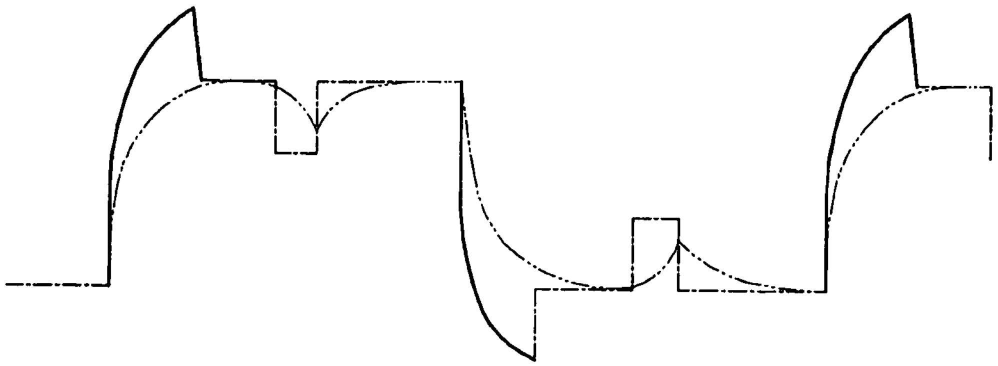
FIGS. 7A and 7B are waveform diagrams illustrating pixel signals overdriven according to the present invention.

FIG. 7A shows a pixel signal S1 and a pixel charging voltage S2 when overdriving an initial portion of a first pixel signal as mentioned above, and a normal pixel signal S3.

Figure 7B:
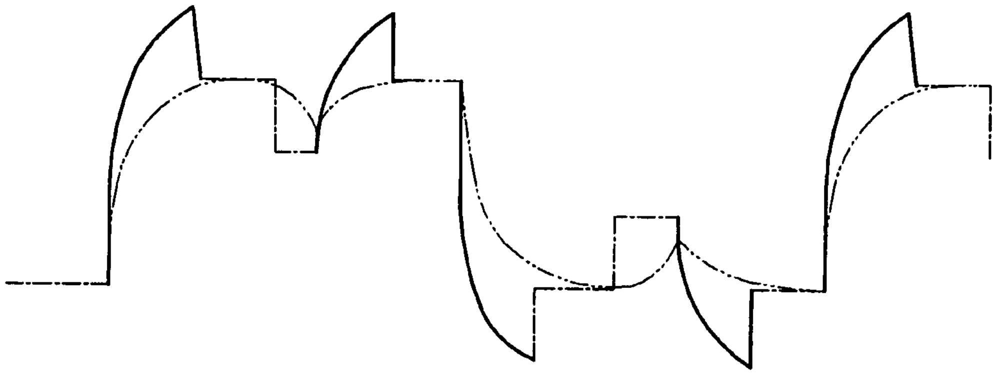

FIG. 7B shows another embodiment of the present invention using a pixel signal S1 and a pixel charging voltage S2 when overdriving each initial portion of first pixel signal and second pixel signal, and a normal pixel signal S3. The method employed in FIG. 7B requires high resolution, which is thusly appropriate when the time periods for a gate signal and a pixel signal becomes short, particularly, appropriate when a delay of a pixel signal is a great influence.

A time of an overdriven region (OD region) and a level of an overdriven voltage in FIGS. 7A and 7B can be appropriately adjusted according to the needs of the application.

FIG. 8 is a table showing a pixel in which an overdriven voltage is inserted and a pixel to which a normal signal is directly applied in case of overdriving pixel signals as shown in FIG. 7B.

As described above, the present invention is implemented such that an initial portion of at least one of two longitudinally adjacent pixel signals can be overdriven when a liquid crystal panel is driven according to a longitudinal two-dot inversion system. Accordingly, an occurrence of stripe patterns due to a charging voltage deviation between the two adjacent pixel signals can be prevented.

Therefore, the present invention can contribute to an enhancement of image quality and implementation of high solution.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A data driving apparatus for a liquid crystal display (LCD) device comprising:

a timing controller configured to output control signals for controlling a driving of a gate driving unit and a data driving unit to display images on a liquid crystal panel;

the gate driving unit configured to output a gate on signal to each of a plurality of gate lines of the liquid crystal panel;

the data driving unit including a D/A converter configured to drive each of a plurality of data lines on the liquid crystal panel with a longitudinal two-dot inversion polarity system; and wherein the D/A converter comprises:

a P-decoder configured to convert digital data into a negative grayscale voltage which is one of 64 analog grayscales and output the grayscale voltage;

a N-decoder configured to convert digital data into a positive grayscale voltage which is one of 64 analog grayscales and output the grayscale voltage;

an overdriving unit configured to output an overdriven negative grayscale voltage to a pair of negative pixels consecutive with each other and an overdriven positive grayscale voltage to a pair of positive pixels consecutive with each other in the form of overdriven negative and positive pixel signals, the pair of negative pixels is consecutive with the pair of positive pixels; and a multiplexer directly electrically connected to the P-decoder, the N-decoder, and a single line of the overdriving unit, configured to output the overdriven negative or positive pixel signals to only a first pixel or output the overdriven negative and positive pixel signals to all pixels in the pairs of the negative and the positive pixels, respectively, through conversion into a first or a second pixel signals which are consecutive with each other in a longitudinal direction, while the multiplexer is selecting the negative grayscale voltage outputted from the P-decoder or the positive grayscale voltage outputted from the N-decoder and the overdriven negative grayscale voltage and the overdriven positive grayscale voltage, and outputting the first or the second pixel signals according to the longitudinal two-dot inversion system, wherein the multiplexer selects the overdriven negative or positive grayscale voltage outputted from the single line of the overdriving unit at an initial portion of the first pixel signal and the multiplexer selects the negative or positive grayscale voltage outputted from the P-decoder or N-decoder for a remaining portion of the first pixel signal and for the second pixel signal or the multiplexer consecutively selects the overdriven negative or positive grayscale voltage outputted from the single line of the overdriving unit at an initial portion of the first and the second pixel signals and the multiplexer selects the negative or positive grayscale voltage outputted from the P-decoder or N-decoder at a remaining portion of the first and the second pixel signals.

2. The apparatus of claim 1, wherein the data driving unit comprises:

a controlling unit configured to output R, G, and B digital data and to output control signals, the digital data having temporarily stored in an internal register;

a bidirectional shift register configured to sequentially shift a pulse for latching the digital data;

a latch configured to latch digital data output from the controlling unit and thereafter shift a level of the data, by using the pulse output from the bidirectional shift register as a clock signal;

a gamma reference voltage output unit configured to generate a plurality of grayscale voltages with predetermined levels for digital to analog (D/A) conversion; and an output buffer configured to buffer the pixel signal output from the D/A converter and to output the buffered pixel signal.

3. The apparatus of claim 2, wherein the gamma reference voltage output unit generates grayscale voltages having 128 predetermined levels for digital to analog (D/A) conversion.

4. The apparatus of claim 1, wherein the length and level of the overdriven pixel signal is adjustable.

5. A data driving method for a liquid crystal display device, in a two-dot inversion driving method by which a polarity of pixel signals are inverted by a dot unit in a horizontal direction and by a two-dot unit in a longitudinal direction, comprising:

overdriving a positive pixel signal or a negative pixel signal to only a first pixel or overdriving the positive and the negative pixel signals to all pixels, respectively, wherein a pair of positive or negative pixel signals are consecutive with each other in a longitudinal direction, wherein the step of overdriving includes an overdriven signal into only a first pixel signal of the pair of positive pixel signals or the pair of negative pixel signals by a D/A converter in a data driving unit including a P-decoder to generate negative grayscale voltages, an N-decoder to generate positive grayscale voltages, and a multiplexer, wherein the multiplexer, directly electrically connected to the P-decoder, the N-decoder, and a single line of an overdriving unit, selects an overdriven negative or positive grayscale voltage outputted from the single line of the overdriving unit at an initial portion of the first pixel signal and selects a negative or a positive grayscale voltage outputted from the P-decoder or the N-decoder for a remaining portion of the first pixel signal and for the second pixel signal or consecutively selects the overdriven negative or positive grayscale voltage outputted from single line of the overdriving unit at an initial portion of the first and the second pixel signals and selects the negative or positive grayscale voltage outputted from the P-decoder or the N-decoder at a remaining portion of the first and the second pixel signals.

* * * * *